G. D. KEFFER.
DEVICE FOR SEPARATING WATER FROM GASOLENE.
APPLICATION FILED APR. 27, 1920.
1,369,113.
Patented Feb. 22, 1921.
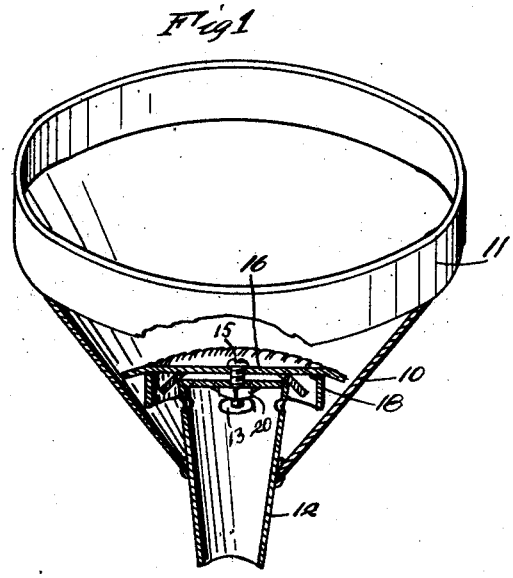
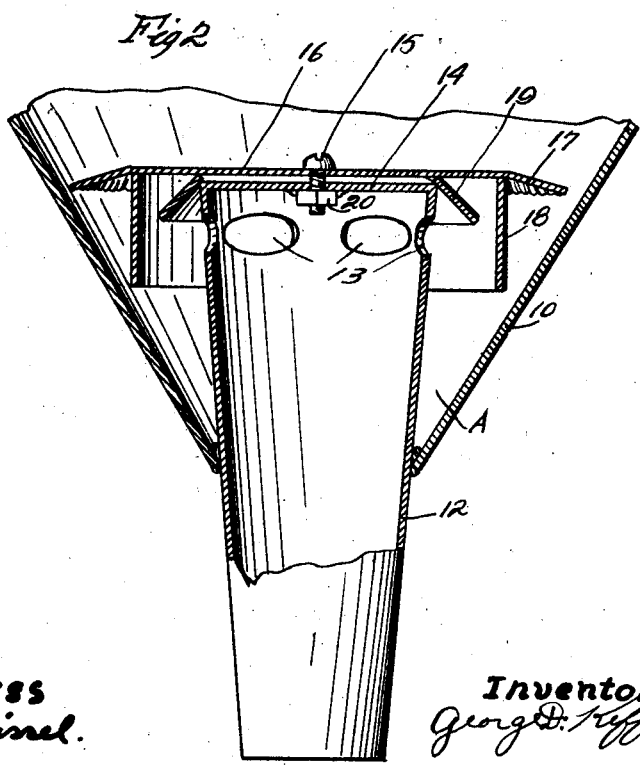

UNITED STATES PATENT OFFICE.

GEORGE D. KEFFER, OF HASTINGS, IOWA.

DEVICE FOR SEPARATING WATER FROM GASOLENE.

1,369,113.  Specification of Letters Patent.  Patented Feb. 22, 1921.

Application filed April 27, 1920. Serial No. 377,086.

*To all whom it may concern:*

Be it known that I, GEORGE D. KEFFER, a citizen of the United States, and resident of Hastings, in the county of Mills and State of Iowa, have invented a certain new and useful Device for Separating Water from Gasolene, of which the following is a specification.

The object of my invention is to provide a device for separating water from gasolene.

A further object of my invention is to provide a device for separating water from gasolene by means of gravity, which device is of very simple, durable and inexpensive construction, and may be installed permanently in a gasolene receptacle or may be used in the form of a detachable device.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a perspective view of a device embodying my invention, parts being shown in section.

Fig. 2 is a side elevation of the lower part of the device, the upper part of the device as shown in Fig. 2, being in vertical cross section.

In the accompanying drawings I have used the reference numeral 10 to indicate generally the outer member forming a part of my device for separating water from gasolene, and comprising a funnel-shaped portion terminating at its upper end in a short cylindrical portion 11. In connection with the member 10 I provide a tubular member 12, slightly tapering from its upper to its lower end, received in the contracted lower end of the member 10 and projected therefrom upwardly and downwardly, as shown in the drawings. A tight connection is formed between the lower end of the member 10 and the outer wall of the tubular member 12.

The tubular member 12 has near its upper end a series of horizontal spaced openings 13. The extreme upper end of the member 12 is closed by a top or cover member 14. Resting upon the top or cover member 14, and preferably connected therewith by means of a screw bolt 15 is a disk-shaped member 16, the outer edge of which is tilted downwardly somewhat, as illustrated at 17.

Extending downwardly from the disk-shaped member 16, and spaced substantially from the member 12, and spaced inwardly also from the extreme outer edge or periphery of the portion 17, is a downwardly-extending annular flange 18, which extends downwardly to a line close to but not quite touching the inner surface of the wall of the member 10, in a plane below the lower edges of the openings 13, as clearly illustrated in Fig. 2.

Extending downwardly from the lower surface of the disk-shaped member 16, and flaring outwardly, is a flange 19, the inner edge of which is above the member 12, so that the member 12 rests against the flange 19, as clearly illustrated in both figures.

On the bolt 15 is a nut 20, which has suitable adjustment.

It is my purpose to provide a device by which mechanical action may be employed for separating water from gasolene. It is well known that water is heavier than gasolene. It is necessary to considerably retard the flow of gasolene in order to separate the gasolene from the water by gravity. With my device the gasolene is poured into the upper part of the member 10, and will flow downwardly around the outer edge of the disk-shaped member 16. The space between the periphery of said disk-shaped member and the inner surface of the wall of the member 10 is small enough so as to considerably limit the flow of gasolene downwardly. The gasolene flows downwardly and is inclined to strike the wall of the member 10, be thus deflected inwardly against the outer wall of the flange 18, and it then flows downwardly to a point of connection between the member 10 and the member 12, and thence upwardly. The flange 19 simply serves as a baffle plate for further slowing the movement of the gasolene. The water will settle in the compartment at the lower part of the member 10 outside the member 12, indicated in Fig. 2 by the letter A, and will not rise high enough to flow through the hole 13 unless the current of gasolene is fast enough to carry the water with it. I have therefore provided the means here shown, for retarding the movement of the gasolene by projecting the flange 18 downwardly below the holes 13. I have also insured the necessity for all the gasolene and water at some time in its passage through the device, to be below the holes 13. The water will then stay below, and the gasolene will then pass upwardly and through the holes 13 and thence downwardly through the member 12.

The flange 19 is preferably somewhat resilient, so that by tightening or loosening the nut 20 on the screw bolt 15, a slight vertical adjustment of the disk 16 is provided for. This vertical adjustment will regulate the size of the opening between the periphery of the disk 16 and the wall of the member 10. The size of such opening is somewhat exaggerated in the drawings.

It is obvious that changes may be made in the construction and arrangement of the parts of my device, without departing from the real spirit and purpose of my invention. It is necessary that the flow of gasolene should be substantially retarded so that when water once has passed to the bottom of the collector chamber A, it will not be carried upwardly by the movement of gasolene, and it is necessary that some means be provided for forcing all of the flowing liquid to a point below the level of the outlet openings 13. It is my intention to cover by my claims any modified forms of structure or use of mechanical equivalents which may be reasonably included within their scope.

I claim as my invention:

1. In a device of the class described, the combination of a substantially funnel-shaped member, a discharge tube for the funnel-shaped member, open at its lower end and projecting upwardly into the interior of the funnel-shaped member, and provided with an opening near its upper end, a substantially horizontal flange supported on the upper end of the discharge tube, with its periphery close to the adjacent portion of the funnel for restricting the flow of liquid from the upper to the lower end of the funnel, and a second flange arranged in a substantially vertical position between the discharge tube and the funnel, and extending from the horizontal flange at its top downwardly to a point below the opening in the discharge tube and spaced from the funnel, for the purposes stated.

2. In a device of the class described, a substantially funnel-shaped member, a tubular member extending upwardly from the contracted lower end thereof, and secured to said funnel-shaped member at the lower end thereof, a hole in said tubular member, at the upper portion thereof, a disk device supported on the upper end of said tubular member, having an annular downwardly-extending flange spaced from its periphery and terminating at its lower edge close to the wall of said funnel-shaped member, and means for supporting said disk on said tubular member, for vertical adjustment.

3. In a device of the class described, a substantially funnel-shaped member, a tubular member extending upwardly from the contracted lower end thereof, and secured to said funnel-shaped member at the lower end thereof, a hole in said tubular member, at the upper portion thereof, a disk device supported on the upper end of said tubular member, having an annular downwardly-extending flange spaced from its periphery and terminating at its lower edge close to the wall of said funnel-shaped member, and a downwardly-extending flaring flange on the lower surface of said disk-shaped member, located outside said tubular member and within the outline of said first flange.

Des Moines, Iowa, April 9, 1920.

GEORGE D. KEFFER.